US006950035B2

United States Patent
Tanaka et al.

(10) Patent No.: US 6,950,035 B2
(45) Date of Patent: Sep. 27, 2005

(54) PARKING ASSIST SYSTEM WITH IMAGE OBTAINING MEANS AND DISPLAYING MEANS

(75) Inventors: Yuu Tanaka, Kariya (JP); Yoshifumi Iwata, Anjo (JP); Hisashi Satonaka, Susono (JP); Tomohiko Endo, Toyota (JP); Mitsuhiko Morita, Sunto-gun (JP); Katsuhiko Iwazaki, Sunto-gun (JP); Seiji Kawakami, Susono (JP); Hiroaki Kataoka, Susono (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/408,232

(22) Filed: Apr. 8, 2003

(65) Prior Publication Data
US 2003/0222793 A1 Dec. 4, 2003

(30) Foreign Application Priority Data
Apr. 8, 2002 (JP) ........................................ 2002-105769

(51) Int. Cl.[7] ................................................ B60Q 1/48
(52) U.S. Cl. ..................... 340/932.2; 340/435; 701/300
(58) Field of Search ............................ 340/435, 932.2, 340/937; 701/1, 23, 36, 41, 300

(56) References Cited

U.S. PATENT DOCUMENTS 4,931,930 A * 6/1990 Shyu et al. .................... 701/36
6,059,063 A   5/2000 Shimizu et al.
6,483,442 B2 * 11/2002 Shimizu et al. ........... 340/932.2
6,683,539 B2 * 1/2004 Trajkovic et al. ......... 340/932.2
6,704,653 B2 * 3/2004 Kuriya et al. ................ 701/301
6,711,473 B2 * 3/2004 Shimazaki et al. ............ 701/1

FOREIGN PATENT DOCUMENTS

| DE | 100 15 897 A1 | 11/2000 |
|----|---------------|---------|
| DE | 101 36 410 A1 | 2/2002  |
| EP | 1 170 171 A2  | 1/2002  |
| EP | 1 170 172 A2  | 1/2002  |
| FR | 2 785 383 A   | 5/2000  |
| JP | 11-334470 A   | 12/1999 |

* cited by examiner

Primary Examiner—Jeffery Hofsass
Assistant Examiner—Eric Blount
(74) Attorney, Agent, or Firm—Burns, Doane, Swecker & Mathis LLP

(57) ABSTRACT

A parking assist system includes an image obtaining means for obtaining an image of a view from a vehicle, a displaying means for displaying the image obtained by the image obtaining means in a monitor display provided in the vehicle, an inputting means for inputting a target parking position, at which the vehicle is parked, on the monitor display, a detecting means for detecting a relative relationship between the vehicle and the target parking position, and a judging means for judging whether or not the vehicle can be parked at the target parking position based upon the relative relationship detected by the detecting means.

15 Claims, 6 Drawing Sheets

PARKING ASSIST SYSTEM WITH IMAGE OBTAINING MEANS AND DISPLAYING MEANS

CROSS REFERENCE TO RELATED APPLICATIONS

This application is based on and claims priority under 35 U.S.C. §119 with respect to a Japanese Patent Application 2002-105769, filed on Apr. 8, 2002, the entire content of which is incorporated herein by reference.

FIELD OF THE INVENTION

This invention generally relates to a parking assist system.

BACKGROUND OF THE INVENTION

A conventional parking assist system for assisting a driver's parking operation has been disclosed in a Japanese Patent Laid-open published as No. 1999-334470, in which an image of a view in a vehicle moving direction captured by a camera is shown on a monitor display installed in a vehicle. More particularly, the disclosed parking assist system assists the driver's parking operation by superposing an expected vehicle moving path in response to a steering angle of a steering handle on the back view captured by the camera. Therefore, the driver turns the steering handle so as to park the vehicle at a predetermined parking position with reference to the expected vehicle moving path along with a parking marker on a screen of the monitor display, the other parked vehicle of the screen thereof, or the like.

The above-disclosed parking assist system is effective for a driver, who is not accustomed to the parking operation, to easily park at an intended parking position. However, according to the parking assist system, the vehicle sometimes can not be parked at the intended parking position in a proper manner. For example, there was a case that the vehicle could not be parked in the parking marker and the vehicle was parked at an angle relative to the parking marker. In such a case, the vehicle may have been unnecessarily operated.

The present invention therefore seeks to provide an improved parking assist system capable of judging whether or not the vehicle can be parked at the intended parking position prior to initial parking operation by a driver.

SUMMARY OF THE INVENTION

According to an aspect of the present invention, a parking assist system includes an image obtaining means for obtaining an image of a view from a vehicle, a displaying means for displaying the image obtained by the image obtaining means in a monitor display provided in the vehicle, an inputting means for inputting a target parking position, at which the vehicle is parked, on the monitor display, a detecting means for detecting a relative relationship between the vehicle and the target parking position, and a judging means for judging whether or not the vehicle can be parked at the target parking position based upon the relative relationship detected by the detecting means.

According to another aspect of the present invention, the judging means judges whether or not the vehicle can be parked at the target parking position based upon a minimum turning radius of the vehicle.

According to further aspect of the present invention, the judging means judges whether or not the vehicle can be parked at the target parking position upon an ordinary-parking mode of the vehicle or upon a parallel-parking mode of the vehicle.

The judging means judges whether or not the vehicle can be parked at the target parking position based upon an expected path generated in combination with a vehicle single turning movement and a vehicle straight movement upon the ordinary-parking mode. Meanwhile, the judging means judges whether or not the vehicle can be parked at the target parking position based upon an expected path generated in combination with a single turning movement to one side of the vehicle, a single turning movement to the other side of the vehicle, and a straight movement.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

An embodiment of the present invention will be described hereinbelow in detail with reference to the accompanying drawings.

Figure 1:
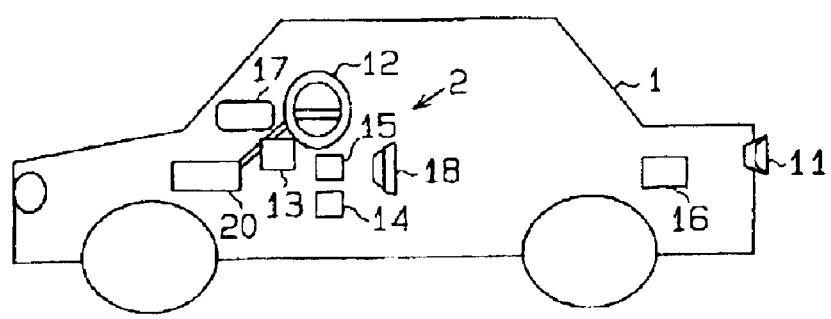
FIG. 1 is a schematic view illustrating a vehicle on which a parking assist system is installed according to an embodiment of the present invention.
Figure 3:
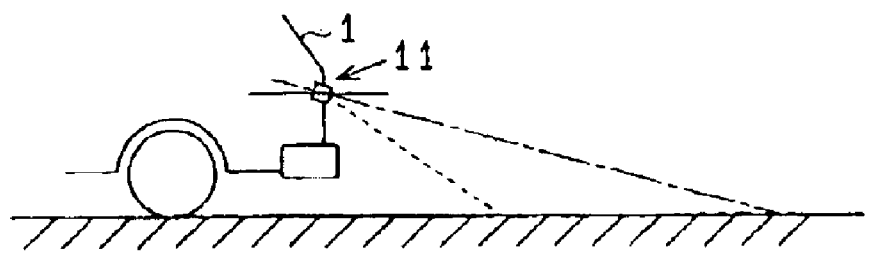
FIG. 3 is a side view illustrating a fixed condition of a camera illustrated in FIG. 1.
Figure 4:
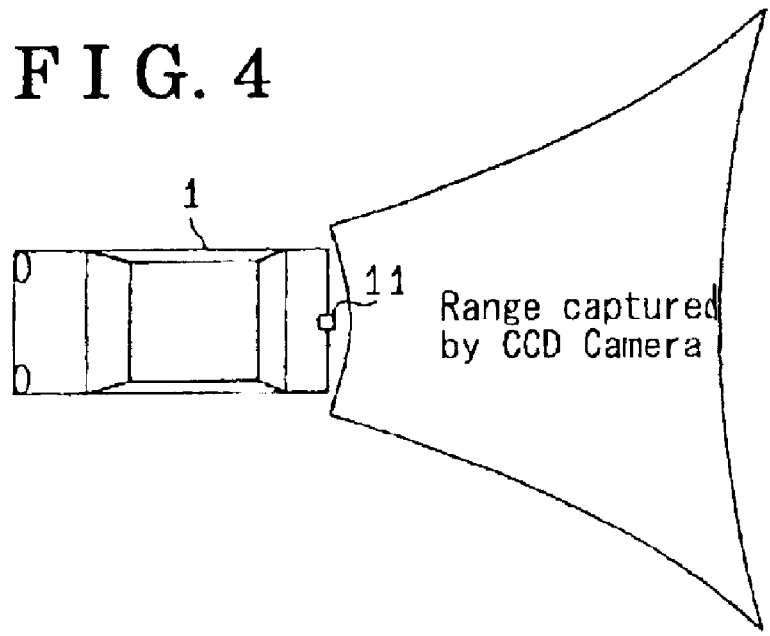
FIG. 4 is a plan view illustrating a range that the came can detect.

As seen in FIG. 1, a parking assist system 2 is installed on a vehicle 1. The parking assist system 2 is provided with a camera (a charge-coupled device camera, i.e. a CCD camera) 1, a steering wheel 12, a steering angle sensor 13, a target parking position input switch 14 (i.e. a target parking position inputting means), a parking switch 15, a yaw rate sensor 16, a back-view monitor display 17, a speaker 18, and a controller 20. The camera 11 functions as an image obtaining means and obtains a vehicle rear view when the vehicle 1 is moving in a rearward direction. The camera 11 outputs an image data in response to the obtained vehicle rear view to the controller 20. The camera 11 is provided at an approximately center of a rear portion of the vehicle 1 with an optic axis directed in a vertically downward direction. More particularly, as illustrated in FIG. 3, the camera 11 is fixed to the central portion at the vehicle rear portion with a predetermined angle, for example 30 degrees, so as to be inclined in the downward direction. As illustrated in FIG. 4, the camera 11 can capture a view, for example with approximately 140 degrees in a lateral direction and approximately 8 meters in the rearward direction by use of a wide-angle lens.

The steering angle sensor 13 is a sensor for detecting a steering angle of a steering wheel 12 turned by a driver and is provided, for example inside of the steering wheel 12. The target parking position input switch 14 functions as a target parking position inputting means and sets the target parking position. The controller 20 is transmitted with a signal in response to a driver's operation of the target parking position input switch 14.

The parking switch 15 is a switch for activating the parking assist system 2 and is provided, for example adjacent to a center console so as to be easily operated by the driver. The parking switch 15 includes an ordinary parking mode switch 15a (explained in FIG. 2), which is operated so as to activate the parking assist system 2 when the vehicle is parked for example, in a garage, in a parking space so as to be by the side of a vehicle parked in a parking space which is at a left or right hand side of the parking space that the driver wants to park in, and a parallel parking mode switch 15b (explained in FIG. 2), which is operated so as to activate the parking assist system 2 when the vehicle is parked parallel with a vehicle that has been parked in a parking space just in front or back of the parking space the driver wants to park in.

The yaw rate sensor 16 detects a rotational angular speed in a vertical axis direction of the vehicle 1. The rotational angular speed represents a variation of a vehicle angle corresponding to turning of the vehicle 1.

Figure 5:
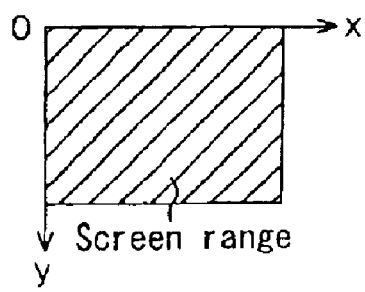
FIG. 5 is a plan view illustrating a screen on a display monitor illustrated in FIG. 1.

The monitor display 17 is provided, for example at the center console. A display area of the monitor display 17 illustrated in FIG. 5 displays a vehicle rear view (a live image) captured by the camera 11 and a graphic image of a reference marker 31 (illustrated in FIG. 6) representing the target parking position.

The speaker 18 functions as a warning means and diffuses predetermined audio instructions corresponding to each stage of a parking procedure, which will be described later.

The controller 20 is accommodated, for example inside of an instrument panel. The controller 20 operates for displaying the vehicle rear view captured by the camera 11 and the graphic image such as the reference marker 31 in the monitor display 17 and for diffusing the predetermined audio instructions based upon the signals from the camera 11, and other units 13 through 16. The controller 20 further detects a relative relationship between the target parking position, which is set based upon the signal from the target parking position input switch 14, and an actual position of the vehicle 1 and judges whether or not the vehicle 1 can be parked at the target parking position based upon the detection. That is, the controller 20 functions as an inputting means, a displaying means, a detecting means, and a judging means.

Figure 2:
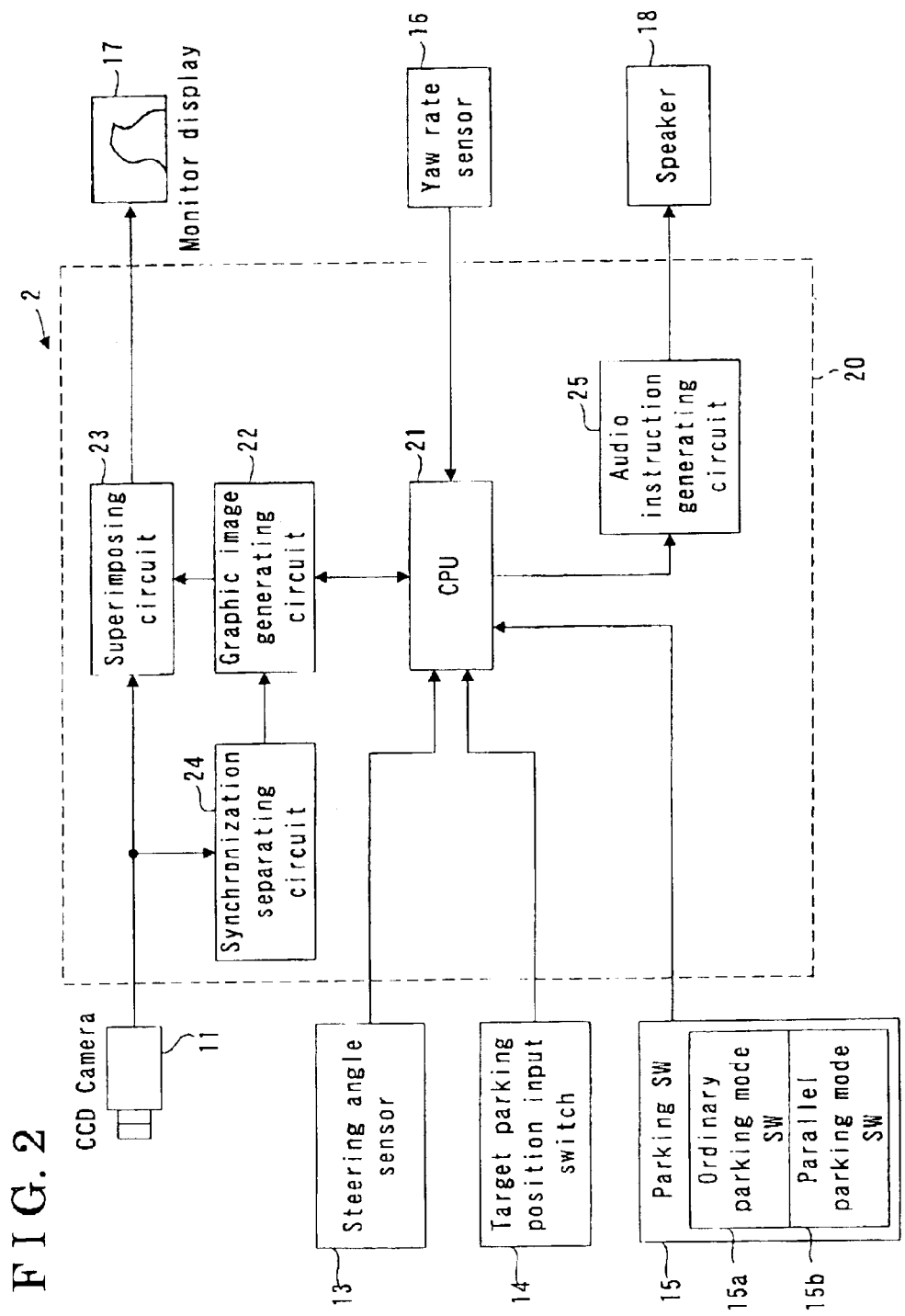
FIG. 2 is a block view explaining a structure of the parking assist system according to the embodiment.

As explained in FIG. 2, the controller 20 is provided with a central processing unit (i.e. CPU) 21, a graphic image generating circuit 22 for generating the graphic image that appears on the monitor display 17, a superimposing circuit 23, a synchronization separating circuit 24, and an audio instruction generating circuit 25. The CPU 21 functions as the inputting means, the judging means, and the detecting means and calculates in various manners therein. The CPU 21 hence judges whether or not the vehicle 1 can be parked at the target parking position.

The graphic image generating circuit 22 generates the graphic image that appears on the monitor display 17. The superimposes circuit 23 superimposes the graphic signal and the vehicle rear view captured by the camera 11. The synchronization separating circuit 24 extracts a synchronization signal from the image of the camera 11 and supplies the signal to the graphic image generating circuit 22. The audio instruction generating circuit 25 generates an audio instruction that is diffused by the speaker 18 to the driver.

Next, the following description will be given for calculating operation in the CPU 21 upon operating the ordinary parking mode switch 15a for actually parking the vehicle 1, for example in the garage, in the parking space so as to be by the side of the vehicle parked in a parking space which is at the left or right hand side of the parking space that the driver wants to park in.

Figure 6:
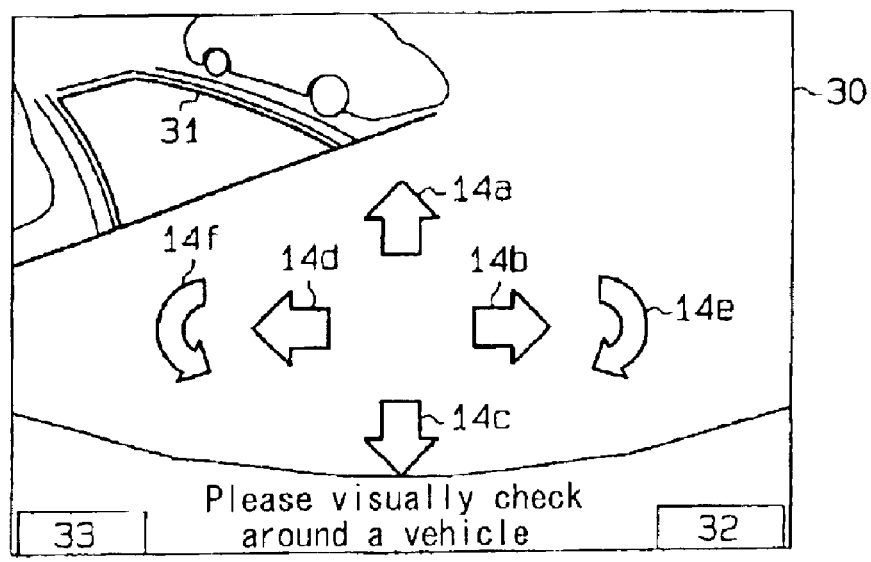
FIG. 6 is an explanatory view of an input screen of a target parking position under an ordinary-parking mode according to the embodiment of the present invention.

When the ordinary parking mode switch 15a is operated by the driver, an input screen 30 for inputting the target parking position appears on the monitor display 17 under the ordinary-parking mode, as illustrated in FIG. 6. The input screen 30 shows the target parking position input switch 14 and the reference marker 31 representing the target parking position. The target parking position input switch 14 include arrowheads 14a, 14b, 14c, and 14d, which respectively indicates upward, rightward, downward, and leftward directions, and arrowheads 14e and 14f, which respectively indicates turning in both directions. The reference marker 31 representing the target parking position possesses an approximately square-shaped structure and is movably controlled in the input screen 30 in accordance with the arrowheads 14a through 14f. The CPU 21 is transmitted with a signal from each arrowhead 14a through 14f touched by the driver, wherein the reference marker 31 is moved to an intended position and the direction thereof is changed based upon each signal inputted into the CPU 21.

After moving the reference marker 31 to the intended position, the CPU 21 once memorizes the target parking position and the vehicle direction at the target parking position in response to a signal from a determining portion 32 touched by the driver.

The CPU 21 further judges whether or not the vehicle 1 can be parked at the target parking position based upon later-described three geometrical relationships between the actual vehicle condition and the target parking position. The judgment is performed corresponding to whether or not the vehicle 1 can be parked at the target parking position in combination with a single turning movement and a straight movement thereto. An expected path can be defined based upon the combination of the single turning movement and the straight movement. The vehicle 1 can be judged by the CPU 21 to be able to be parked at the target parking position when the three geometrical relationships are satisfied. Further, the operation of the parking assist system 2 is terminated by touching an assist canceling portion 33 shown on the input screen 30 as needed.

Figure 7:
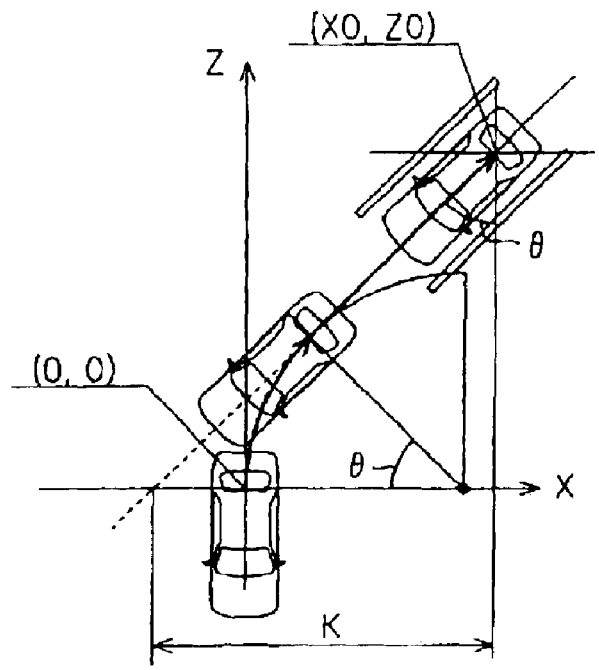
FIG. 7 is an explanatory view for explaining a first condition to judge whether or not the vehicle can be parked at the target parking position under the ordinary-parking mode.

As illustrated in FIG. 7, the following first geometrical relationship is required to be satisfied so as to judge whether or not the vehicle 1 can be parked at the target parking position. The CPU 21 determines a coordinate system $(X, Z)$ of the vehicle 1, which consists of an X axis and a Z axis, based upon an actual posture of the vehicle 1 when judging whether or not the vehicle 1 can be parked at the target parking position. The X axis extends in a right and left-hand side direction of the vehicle 1 and the Z axis extends in a forward and rearward direction thereof. The actual position of the vehicle 1 is set at an original point (0,0). The CPU 21 calculates and memorizes an coordinate (X0, Z0) of the target parking position based upon a relationship of the original point (0,0) relative thereto. The CPU 21 sets and memorizes a vehicle inclining degree at the target parking position as a parking angle θ which is defined relative to a moving direction of the vehicle 1 at the original point (0, 0).

The CPU 21 then calculates a value of K in accordance with the following equation:

$$K=Z0\cdot\tan(\theta).$$

The value of K calculated in accordance with the aforementioned equation should be substantially equal to or greater than a value represented by the x-coordinate X0 so as to park the vehicle 1 at the target parking position in combination with the single turning movement and the straight movement. That is, a straight line extending from the coordinate (X0, Z0) with the parking angle θ relative to the Z axis is required to intersect with the X axis within a negative area of the X axis.

Figure 8:
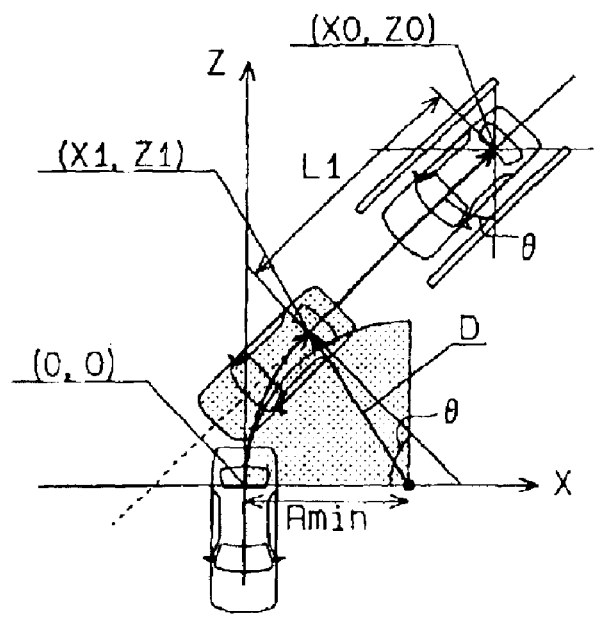
FIG. 8 is an explanatory view for explaining a second condition to judge whether or not the vehicle can be parked at the target parking position under the ordinary-parking mode.

As illustrated in FIG. 8, the following second geometrical relationship is required to be satisfied so as to judge whether or not the vehicle 1 can be parked at the target parking position. A turning radius forming an expected arched path of the vehicle 1 to the target parking position is required to be greater than a minimum turning radius (Rmin) of the vehicle 1 determined based upon vehicle turning characteristics so as to smoothly park the vehicle 1 at the target parking position. The CPU 21 calculates a coordinate (X1, Z1), which is a turning end point of the expected arched path, in accordance with the following equations:

$$X1=X0-L1\cdot\sin(\theta), \text{ and}$$

$$Z1=Z0-L1\cdot\cos(\theta).$$

The numeric value designated by "L1" represents a distance from the vehicle 1 to the target parking position when the vehicle 1 is moving straight after the turning operation. The CPU 21 further calculates a numeric value designated by "D" in accordance with the following equation;

$$D=\{(X1-R\min)^2+Z1^2\}^{1/2}.$$

The numeric value designated by "D" represents a distance between a guiding center of the minimum turning operation of the vehicle 1 at the original point (0, 0) and the coordinate (X1, Z1). The numeric value designated by "D" is required to be substantially equal to or greater than the minimum turning radius (Rmin).

Figure 9:
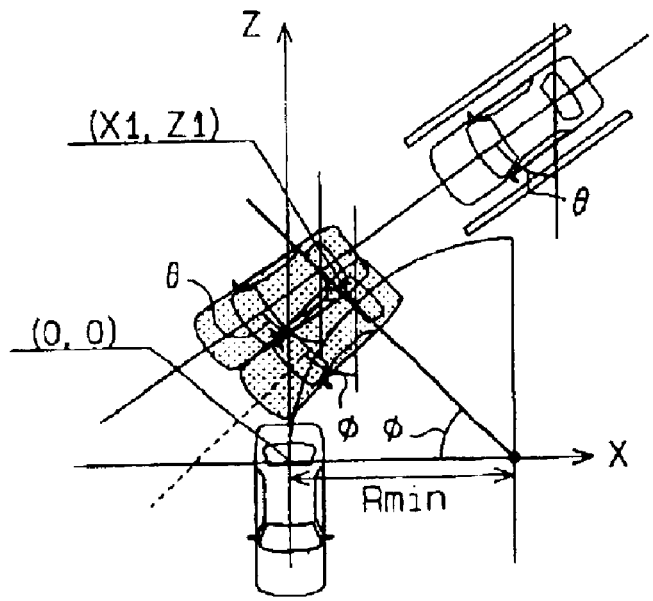
FIG. 9 is an explanatory view for explaining a third condition to judge whether or not the vehicle can be parked at the target parking position under the ordinary-parking mode.

As illustrated in FIG. 9, the following third geometrical relationship is required to be satisfied so as to judge whether or not the vehicle 1 can be parked at the target parking position.

The vehicle 1 can not be turned at a radius being less than the minimum turning radius Rmin so as to park the vehicle at the target vehicle position at a target angle. Therefore, when the parking angle θ at the coordinate (X1, Z1) is greater than a vehicle angle (i.e. an angle on a path) φ generated in response to the turning movement of the vehicle 1 at the minimum turning radius Rmin, the vehicle can not be turned. The CPU 21 first calculates the vehicle angle φ in accordance with the following equation;

$$\phi=\tan^{-1}\{Z1/(R\min-X1)\} \ (R\min>X1),$$

$$\phi=90° \ (R\min=X1), \text{ and}$$

$$\phi=18020-\tan^{-1}\{Z1/(X1-R\min)\} \ (R\min<X1).$$

The vehicle angle φ is required to be substantially equal to or greater than the parking angle θ.

When the above-described three conditions are satisfied, the CPU 21 judges that the vehicle 1 can be easily and properly parked at the target parking position. The monitor display 17 hence indicates that the vehicle 1 can be parked at the target parking position and the speaker 18 diffuses the predetermined audio instruction for announcing the driver that the vehicle 1 can be parked at the target parking position.

On the other hand, when at least one of the above-described three conditions is not satisfied, the CPU 21 judges that the vehicle 1 can not be easily and properly parked at the target parking position. The monitor display 17 hence indicates that the vehicle 1 can not be parked at the target parking position and the speaker 18 diffuses the predetermined audio instruction for announcing the driver that the vehicle 1 can not be parked at the target parking position.

Next, the following description will be given for calculating operation in the CPU 21 upon operating the parallel-parking mode switch 15b of the parking switch 15 for actually parallel-parking the vehicle 1.

When the parallel-parking mode switch 15b is operated by the driver, an input screen (not shown) appears on the monitor display 17 under the parallel-parking mode and the target parking position is inputted in the same manner as the aforementioned ordinary-parking operation of the vehicle 1.

The CPU 21 further judges whether or not the vehicle 1 can be parked at the target parking position based upon a geometrical relationship between the actual vehicle condition and the target parking position. The CPU 21 judges whether or not the vehicle 1 can be parked at the target parking position on the assumption that the actual vehicle is substantially parallel to a vehicle direction parked at the target parking position.

Further, the CPU 21 judges that the vehicle 1 can be parallel-parked at the target parking space in accordance with a following geometrical relationship when the vehicle 1 can be parallel-parked in combination with a single turning operation to one side of the vehicle 1, a single turning operation to the other side of the vehicle 1, and a straight movement.

Figure 10:
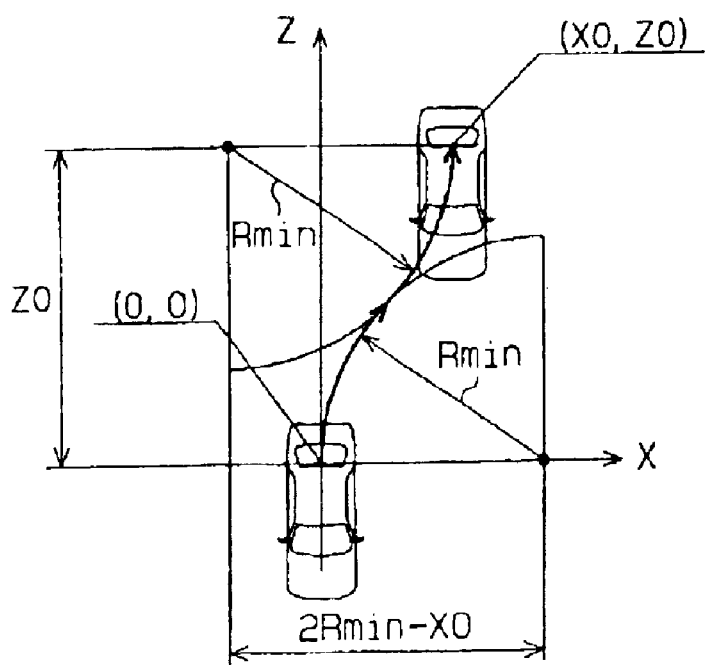
FIG. 10 is an explanatory view for explaining a condition to judge whether or not the vehicle can be parked at the target parking position under a parallel-parking mode.

As illustrated in FIG. 10, the CPU 21 determines the actual position of the vehicle 1 at the original point (0,0). The CPU 21 further calculates and memorizes the coordinate (X0, Z0) of the target parking position. The vehicle 1 can not be turned at a radius being less than the minimum turning radius Rmin. Therefore, the following conditional expression is required to be satisfied so as to park the vehicle 1 at the target parking position;

$$(2R\min-X0)^2+Z0^2\geq(2R\min)^2.$$

When the above-described condition is satisfied, the CPU 21 judges that the vehicle 1 can be easily and properly parked at the target parking position. The monitor display 17 hence indicates that the vehicle 1 can be parked at the target parking position and the speaker 18 diffuses the predetermined audio instruction for announcing the driver that the vehicle 1 can be parked at the target parking position.

On the other hand, when the above-described condition is not satisfied, the CPU 21 judges that the vehicle 1 can not be easily and properly parked at the target parking position.

The monitor display 17 hence indicates that the vehicle 1 can not be parked at the target parking position and the speaker 18 diffuses the predetermined audio instruction for announcing the driver that the vehicle 1 can not be parked at the target parking position.

As described above, following effects can be obtained according to the embodiment of the present invention.

(1) The controller 20 judges whether or not the vehicle 1 can be parked at the target parking position prior to the actual parking operation of the vehicle 1 and warns an occupant whether or not the vehicle 1 can be parked prior thereto. Therefore, the occupant can be warned in advance whether or not the vehicle 1 can be parked at the target parking position, thereby capable of preventing unnecessary steering operation of the steering handle 12.

(2) The driver can be warned by the monitor display 17 or the audio instructions diffused from the speaker 18 whether or not the vehicle 1 can be parked at the target parking position. Therefore, the driver can be easily recognized whether or not the vehicle 1 can be parked.

(3) Upon the ordinary-parking mode, the CPU 21 judges that the vehicle 1 can be parked at the target parking space when the vehicle 1 can be parked therein in combination with the single turning movement and the straight movement. Therefore, the driver can easily and properly park the vehicle 1 at the target parking space when the CPU 21 judges that the vehicle 1 can be parked at the target parking space.

(4) Upon the parallel-parking mode, the CPU 21 judges that the vehicle 1 can be parked at the target parking space when the vehicle 1 can be parked therein in combination with the single turning movement to the one side of the vehicle 1, the single turning movement to the other side thereof, and the straight movement. Therefore, the driver can easily and properly park the vehicle 1 at the target parking space when the CPU 21 judges that the vehicle 1 can be parked at the target parking space.

The present invention is not limited to the above-described embodiment and can be applied to modifications of the above-described embodiment.

According to the embodiment of the present invention, the parking assist system 2 is activated in response to operating the ordinary-parking mode switch 15a. Alternatively, the parking assist system 2 can be activated by recognizing a voice of the driver.

According to the embodiment of the present invention, the image screen appearing on the monitor display 7 and the audio instructions from the speaker 18 are respectively switched as needed. However, the image screen switching mechanism and the audio instruction switching mechanism sometimes are not required in response to the driver's driving ability. Therefore, the image screen switching mechanism and the audio instruction switching mechanism can be set non-operative for each driver.

According to the embodiment of the present invention, the camera 11 is provided at the rear portion of the vehicle 1 so as to assist the parking operation of the vehicle 1 in the rearward direction. Alternatively, the camera 11 can be provided at a front portion of the vehicle 1 so as to assist the parking operation of the vehicle 1 in a forward direction.

According to the embodiment of the present invention, the parking assist operation is completed by the parking assist system 2 installed on the vehicle 1. Alternatively, the vehicle 1 can be parked with an assist in response to an external signal from an external device.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A parking assist system comprising:
   an image obtaining means for obtaining an image of a view from a vehicle;
   a displaying means for displaying the image obtained by the image obtaining means in a monitor display provided in the vehicle;
   an inputting means for inputting a target parking position, at which the vehicle is parked, on the monitor display;
   a detecting means for detecting a relative relationship between the vehicle and the target parking position;
   a judging means for judging whether or not the vehicle can be parked at the target parking position upon a parallel-parking mode of the vehicle based upon the relative relationship detected by the detecting means; and
   wherein the judging means judges whether or not the vehicle can be parked at the target parking position based upon an expected path generated in combination with a single turning movement to one side of the vehicle, a single turning movement to the other side of the vehicle, and a straight movement.

2. A parking assist system according to claim 1, wherein the judging means judges whether or not the vehicle can be parked at the target parking position based upon a minimum turning radius of the vehicle.

3. A parking assist system according to claim 1, further comprising: a warning means for warning an occupant of a judgment result by the judging means.

4. A parking assist system according to claim 1, wherein the inputting means inputs the target parking position on the monitor display in response to operation of a target parking position inputting means.

5. A parking assist system according to claim 4, wherein the target parking position inputting means is a target parking position input switch touched by an occupant so as to input the target parking position at an intended position on the monitor display.

6. A parking assist system comprising:
   image obtaining means for obtaining an image of a view from a vehicle;
   displaying means for displaying the image obtained by the image obtaining means in a monitor display provided in the vehicle;
   inputting means for inputting a target parking position, at which the vehicle is parked, on the monitor display;
   detecting means for detecting a relative relationship between the vehicle and the target parking position; and
   judging means for judging that the vehicle located at an original position can be parked at the target parking position based upon satisfaction of all of the following conditions: (1) a straight line extending from a coordinate (X0, Z0) at a parking angle (θ) relative to the Z axis intersects the X axis within a negative area of the X axis, wherein the coordinate (X0, Z0) represents the coordinate of the target parking position; (2) a distance D is substantially equal to or greater than a minimum turning radius $R_{min}$ of the vehicle, where the distance D represents the distance between a guiding center of a minimum turning operation of the vehicle at the original point (0, 0) and a coordinate (X1, Z1), and the coordinate (X1, Z1) represents a turning end point of an expected arched path of movement of the vehicle during parking; and (3) a vehicle angle $\phi$ generated in response to turning movement of the vehicle at the minimum turning radius $R_{min}$ is substantially equal to or greater than the parking angle ($\theta$).

7. A parking assist system according to claim 6, wherein the judging means judges that the vehicle can be parked at the target parking position upon an ordinary-parking mode of the vehicle.

8. A parking assist system according to claim 7, wherein the judging means judges that the vehicle can be parked at the target parking position based upon an expected path generated in combination with a vehicle single turning movement and a vehicle straight movement upon the ordinary-parking mode.

9. A parking assist system according to claim 6, wherein the judging means judges that the vehicle can be parked at the target parking position based upon an expected path generated in combination with a vehicle single turning movement and a vehicle straight movement upon an ordinary-parking mode.

10. A parking assist system according to claim 6, wherein the judging means judges that the vehicle can be parked at the target parking position before an initial vehicle moving operation by a driver of the vehicle.

11. A parking assist system comprising:

image obtaining means for obtaining an image of a view from a vehicle;

displaying means for displaying the image obtained by the image obtaining means in a monitor display provided in the vehicle;

inputting means for inputting a target parking position, at which the vehicle is parked, on the monitor display;

detecting means for detecting a relative relationship between the vehicle and the target parking position; and judging means for judging that the vehicle can be parked at the target parking position based upon satisfaction of the condition $(2Rmin-X0)^2 + Z0^2 \geq (2R_{min})^2$, where $R_{min}$ is a minimum turning radius of the vehicle and X0, Z0 are coordinates of the target parking position.

12. A parking assist system according to claim 11, wherein the judging means judges that the vehicle can be parked at the target parking position upon a parallel-parking mode of the vehicle.

13. A parking assist system according to claim 12, wherein the parallel-parking mode is selected when the vehicle is parked parallel with a vehicle that has been parked in a parking space just in front of a parking space that a driver of the vehicle wants to park in.

14. A parking assist system according to claim 11, wherein the judging means judges that the vehicle can be parked at the target parking position before an initial vehicle moving operation by a driver of the vehicle.

15. A parking assist system according to claim 7, wherein the ordinary-parking mode is selected when the vehicle is parked, for example, in a garage, in a parking space so as to be by the side of a vehicle parked in a parking space which is at a left or right hand side of the parking space that a driver wants to park in.

* * * * *